(No Model.)
F. T. CHEW.
MINING MACHINE.
No. 305,669. Patented Sept. 23, 1884.
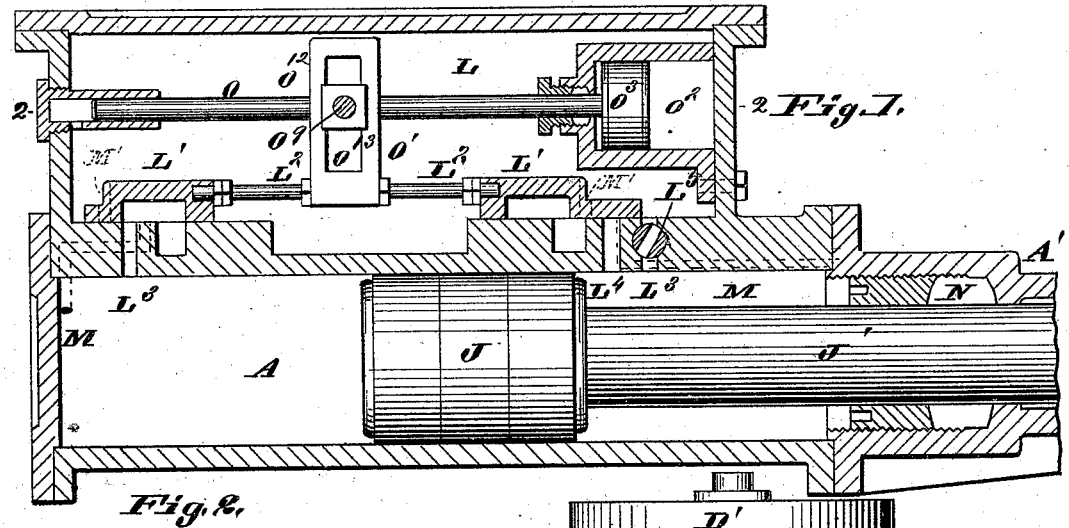
Fig. 1.
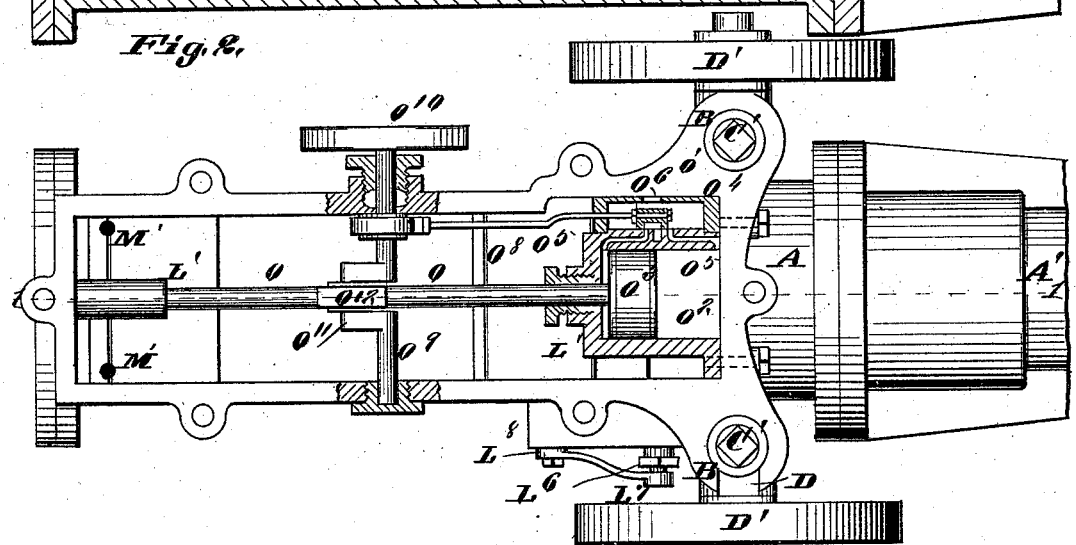
Fig. 2.
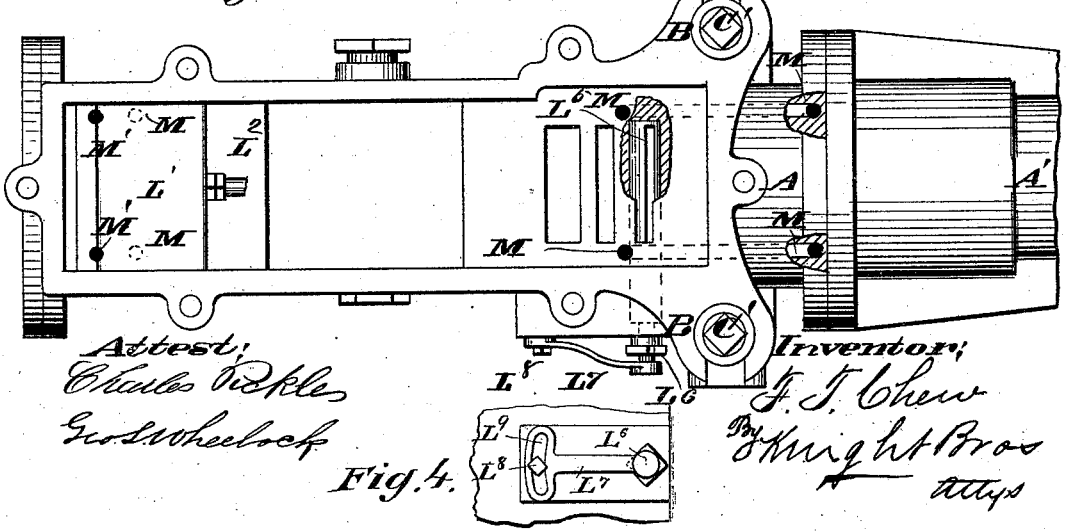
Fig. 3.
Fig. 4.
Attest:
Charles Pickle
Geo. S. Wheelock
Inventor:
F. T. Chew
By Knight Bros
Attys

UNITED STATES PATENT OFFICE.

FRANCIS T. CHEW, OF ST. LOUIS, MISSOURI, ASSIGNOR OF ONE-HALF TO THE ELLSWORTH COAL COMPANY, OF DANVILLE, ILLINOIS.

MINING-MACHINE.

SPECIFICATION forming part of Letters Patent No. 305,669, dated September 23, 1884.

Application filed March 21, 1884. (No model.)

*To all whom it may concern:*

Be it known that I, FRANCIS T. CHEW, of the city of St. Louis, in the State of Missouri, have invented a certain new and useful Improvement in Mining-Machines, of which the following is a full, clear, and exact description, reference being had to the accompanying drawings, forming part of this specification, and in which—

Figure 1 is a longitudinal section through the cylinders, taken on line 1 1, Fig. 2. Fig. 2 is a longitudinal section taken on line 2 2, Fig. 1. Fig. 3 is a top view with the top plate of the main air or steam chest removed. Fig. 4 is an elevation of one of the valve-levers.

My invention relates to certain improvements in mining-machines; and it consists in features of novelty hereinafter fully described, and pointed out in the claim.

Referring to the drawings, L represents the chest of the cylinder A; $L'$, the valves connected by a rod, $L^2$; $L^3$, the inlet-ports, and $L^4$ the exhaust-ports. The inlet-ports are between the exhaust-ports and the heads of the cylinder, and they are preferably provided with valves $L^5$, (see Figs. 1 and 3,) to regulate the amount of air entering the cylinder. The valves $L^5$ may be turned by any suitable means. I have shown them provided each with a square portion, $L^6$, to receive a wrench.

$L^7$ represents levers secured to the outer ends of the valves, their free ends being secured to the machine by set-screws $L^8$, fitting in slots $L^9$ in the ends of the levers. (See Fig. 4.) The levers may be made use of to turn the valves, and, by tightening the set-screws, will hold the valves to any adjustment.

M represents ports leading from near the main inlet-ports $L^3$ to the ends of the cylinder, their office or function being to allow induction of a small supply of air in advance of the main supply. These ports can only communicate with the chest when openings or holes $M'$ in the valves $L'$ (see Figs. 2 and 3) come over them, and as the valves are always moving when the machine is in operation, a very small amount of air is admitted in advance of the main supply. The valves never move far enough to expose the openings of the ports M, except through means of the holes $M'$. The valves are so arranged that the ports M are closed after the piston has passed the main inlet-ports, so that air is imprisoned for cushioning the piston.

N represents a screw-threaded packing, fitting in the front head of the piston. (See Fig. 1.) The packing may be turned by any suitable means, and thus in a measure regulate the throw of the piston.

Both of the main inlet-ports may be provided with the valves $L^5$, or only the one in the front end of the cylinder, and generally only the one would be used which would be regulated to let just enough air in to return the piston.

The valves $L'$ would be operated by any suitable motive power. I have shown their stem connected by means of an arm, $o'$, to the piston-rod $o$ of a small engine, of which $o^2$ is the cylinder, $o^3$ the piston, $o^4$ the chest, $o^5$ the inlet-ports, $o^6$ the exhaust-port, $o^7$ the valve, and $o^8$ the valve-stem. The stem $o^8$ is connected by means of an eccentric with a shaft, $o^9$, journaled in the sides of the main chest L, and provided with a fly-wheel, $o^{10}$, on one end and a crank, $o^{11}$, near its center, which is provided with a box, $o^{12}$, working in a slot, $o^{13}$, of the arm $o'$. The shaft is thus turned by means of the arm to operate the valve of the small engine.

I claim as my invention—

In a mining-machine, the inlet-ports for admitting a small amount of air in advance of the main supply, in combination with the main valves, provided with perforations to expose the said ports, substantially as and for the purpose set forth.

FRANCIS T. CHEW.

In presence of—
GEO. H. KNIGHT,
BENJN. A. KNIGHT.